United States Patent [19]
Long et al.

[11] Patent Number: 5,322,989
[45] Date of Patent: Jun. 21, 1994

[54] ON-THE-FLY SMART CARD READER

[75] Inventors: John A. Long, Scarborough; Paul J. Connelly, Toronto, both of Canada

[73] Assignee: Longford Equipment International Limited, Scarborough, Canada

[21] Appl. No.: 35,787

[22] Filed: Mar. 23, 1993

[51] Int. Cl.[5] ............................................. G06F 15/20
[52] U.S. Cl. ..................................... 235/375; 235/492
[58] Field of Search ................. 235/375, 492; 364/478

[56] References Cited
U.S. PATENT DOCUMENTS 4,827,425 5/1989 Linden ................................. 235/492

*Primary Examiner*—Harold Pitts

[57] ABSTRACT

An on-the-fly smart card reader has a card conveyor for continuously conveying smart cards in a downstream direction at regular intervals. A support has a pair of read heads spaced at an interval equal to the interval between cards on the conveyor. The read heads have spring-loaded contact probes which overlie the card conveyor. The support is driven in synchronism with the card conveyor in a circulating path with a downstream path segment proximate the card conveyor. The support is positioned such that, while travelling downstream, its read heads are positioned for mating with the contacts of an adjacent pair of smart card travelling along the card conveyor.

4 Claims, 3 Drawing Sheets

ON-THE-FLY SMART CARD READER

BACKGROUND OF THE INVENTION

1. Field of the Invention

This invention relates to an on-the-fly smart card reader.

2. Description of the Related Art

A smart card has a silicon chip embedded in it which may contain far greater amounts of information than the magnetic strips of current information bearing cards. The chips of these smart cards typically have eight input/output ports in the nature of contacts. One contact is to power up the chip and remainder are used for addressing memory locations in the chip and retrieving data from these memory locations. Current smart card readers have a slot into which a card is inserted until it hits a stop. When the card abuts the stop, the chip is aligned with a read head whose contacts mate with the contacts of the chip to power up the chip and commence reading from the chip.

The current method of reading smart cards is not adapted to handle a high throughput of cards. A high throughput may be required when, for example, sending out new cards to their owners.

This invention seeks to overcome drawbacks of known smart card readers.

SUMMARY OF THE INVENTION

According to the present invention, there is provided an on-the-fly smart card reader comprising: a card conveyor for continuously conveying smart cards, each having an embedded silicon chip with exposed ports, at regular intervals along a card path in a downstream direction; a support supporting a smart card read head; means for driving said support continuously in a circulating path, said circulating path having a path segment aligned with a portion of said card path, said driving means driving said support along said path segment in said downstream direction and in synchronism with said card conveyor such that said smart card read head is positioned for operative association with the ports of a smart card travelling along said portion of said card path.

BRIEF DESCRIPTION OF THE DRAWINGS

In the figures which disclose example embodiments of the invention.

DESCRIPTION OF THE PREFERRED EMBODIMENTS

Figure 1:
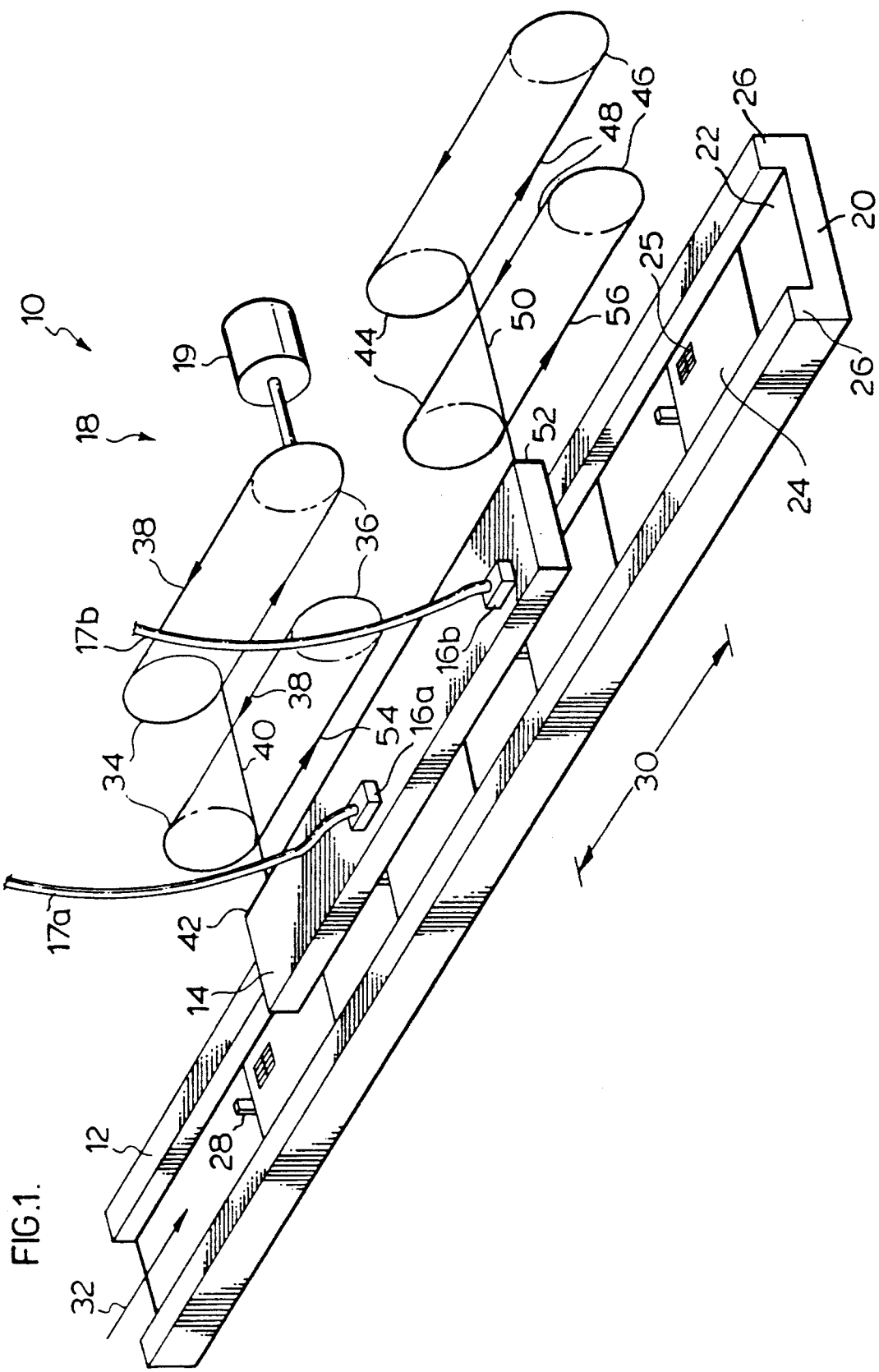
FIG. 1 is a perspective view of an on-the-fly smart card reader made in accordance with this invention.

With reference to FIG. 1, an on-the-fly smart card reader 10 comprises a card conveyor 12, a support 14 supporting smart card read heads 16a and 16b and a drive 18 (illustrated schematically) for driving the support 14 in a circulating path.

The card conveyor comprises a chute 20 with a base 22 terminating in upstanding arms 26. The arms 26 are spaced slightly greater than the width of a smart card 24. The card conveyor has a number of drive lugs 28 spaced at regular intervals 30 along the length of the conveyor. The drive lugs are chain driven in the downstream direction 32 by conveyor motor 19 through a mechanical linkage (not shown) in order to push smart cards in this downstream direction.

The drive 18 for the support comprises a pair of upstream chain loops 38 mounted between co-axial wheels 34 and co-axial wheels 36. A bar 40 is connected to each of the two chain loops 38 such that the bar extends transversely of the chain loops and transversely of chute 20. The bar 40 is connected to the side of the upstream end 42 of support 14. Similarly, a pair of downstream chain loops 48 are mounted between wheels 44 and wheels 46 and a bar 50a is mounted to the two chain loops 48 transversely of the loops 48 and chute 20 and is connected to the downstream end 52 of the support 14. The motor 19 drives the upstream chain loops 38 (and therefore the downstream chain loops by transmission of force through the support 14) in a counterclockwise direction in order to move the support in a circulating path. This circulating path has a path segment represented by the bars travelling along the lower portions 54 and 56 of the chain loops 38 and 48, respectively, which parallels the downstream direction 32 for the cards 24 conveyed by the card conveyor 12. Because motor 19 drives the drive lugs 28 as well as both chain loops 38, 48, the drive 18 drives the support 14 in synchronism with the card conveyor 12. The read heads 16a, 16b of the support are spaced at an interval which is the same as regular interval 30 for the drive lugs 28. The read heads 16a, 16b have electrical connecting wires 17a, 17b, respectively, extending thereto.

Each smart card 24 has eight input/output ports in the nature of contacts 25. Smart cards are designed such that the contacts 25 are at a fixed position on each card. However, there are two conventions such that there are two different fixed positions for these contacts.

Figure 2:
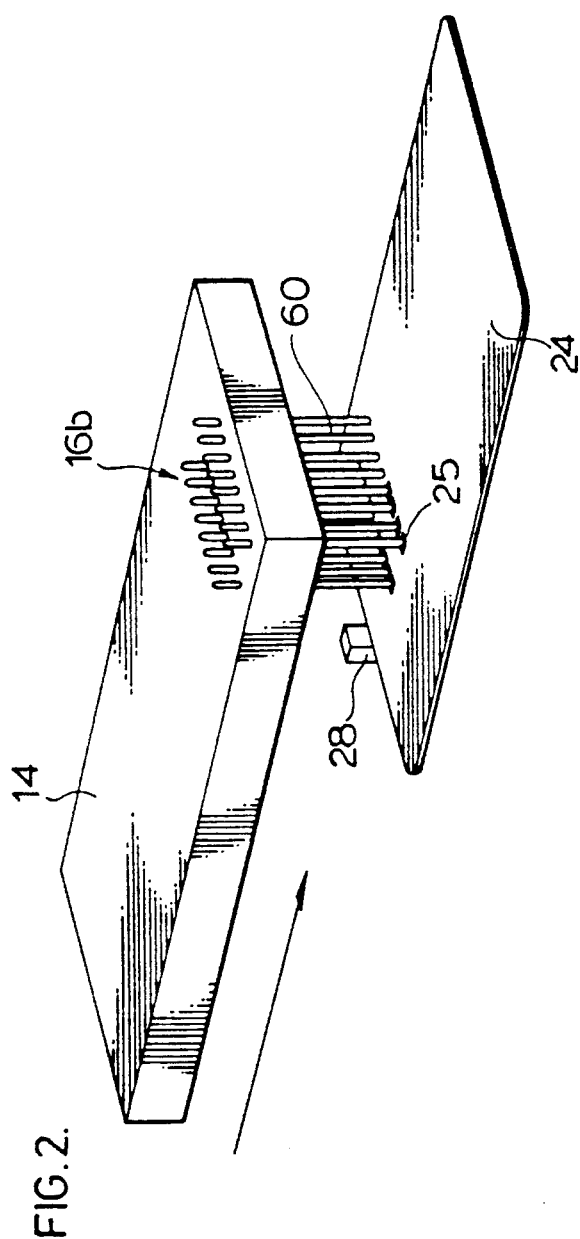
FIG. 2 is a perspective view of a portion of FIG. 1.

With reference to FIG. 2 which illustrates a portion of FIG. 1, read head 16b comprises sixteen spring-loaded contact probes 60. These contact probes are sized to mate with contacts 25 of a silicon chip embedded in the smart card 24. Further, these probes are laterally positioned such that one set of eight probes is laterally aligned with the contacts of a smart card travelling on the card conveyor having its contacts in one of the two conventional positions and the other set of eight probes is laterally aligned with the contacts of a smart card on the conveyor having its contacts in the other of the two conventional positions.

On set-up, the support is longitudinally positioned such that when it is travelling along its downstream path segment (defined by the bars 40, 50 moving along lower segments 54, 56 of the chain loops), the probes 60 of the read head 16b are positioned a selected distance downstream of a drive lug 28 such that they are longitudinally aligned with the contacts of a smart card conveyed by the drive lug. For a given smart card, one set of eight of the spring-loaded contact probes 60 will mate with the eight contacts 25 of the card 24 and the other eight springloaded contact probes 60 of the read head 16b will simply abut the top of the smart card 24. While not shown, read head 16a is similarly constructed and positioned for contact with the contacts of the next adjacent upstream smart card 24.

In operation, smart cards 24 are conveyed in the downstream direction 32 at regular intervals 30 by drive lugs 28 of the card conveyor 12. In synchronism with the card conveyor, support 14 moves in a circulating path: moving in the downstream direction 32 and proximate the chute 20 while the support moves along a path segment defined by the bars 40, 50 travelling along loop segments 54, 56 and subsequently moving in an upstream direction more distant from the chute. While moving in the downstream path segment, the read heads 16a, 16b of the support 14 mate with the contacts of an adjacent pair of smart cards on the card conveyor 12. During this time, the chips of this card are powered up and data is read therefrom. At the downstream end of the downstream path segment, the support begins to move away from these adjacent smart cards and then in an upstream direction. By the time the support again changes direction and is moving downstream along its downstream path segment, the read heads 16a, 16b are positioned so as to mate with the contacts of the next upstream pair of smart cards 24 on the card conveyor. Reading of consecutive pairs of cards continues in this way.

The dwell time of a read head on a card depends upon the length of the downstream path segment (defined by the length of chain loop segments 54 and 56) as well as the conveyor speed. The duration of this dwell is selected so as to be sufficient to allow time to read the required data from these smart cards. It will be appreciated that only a portion of the data stored on the card may need be read such that the dwell time need be sufficient only to allow for the reading of this small subset of data. Such is the case where the reader 10 is used to read personal identification data from the smart cards in a mailing system for directing the smart cards to their intended recipients.

Higher conveyor speeds require longer downstream path segments for the support for a given dwell time. There is an interrelationship between the length of the downstream path segment of the support and the number of read heads required for support 14. Thus, if chain segments 54 and 56 are lengthened, then three (or more) read heads may be required in order for the synchronized support 14 to read each card on the conveyor. Conversely, a lower conveyor speed may allow shorter segments 54 and 56 and only one read head may be necessary.

Figure 3:
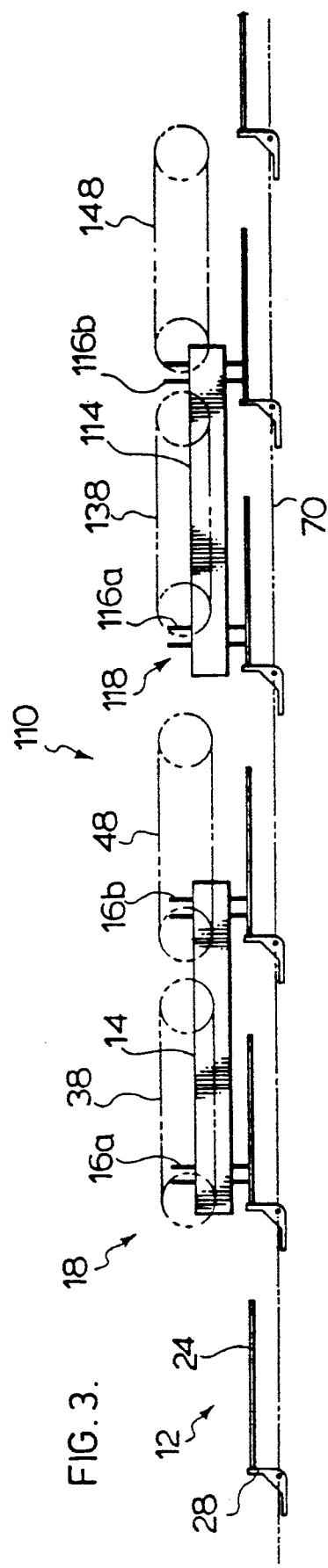
FIG. 3 is a side view of an on-the-fly smart card reader made in accordance with another embodiment of this invention.

FIG. 3 is a side view of an alternate embodiment for the invention wherein like parts have been given like reference numerals. Turning to FIG. 3 smart card reader 110 has a second support 114 downstream of support 14. Support 114 has read heads 116a and 116b and is driven by a drive 118 with chains 138 and 148. Support 114 allows each smart card 24 on the card conveyor 12 to be read twice. This reduces the possibility of reading errors. FIG. 3 also illustrates the chain drive 70 for the drive lugs 28 of the card conveyor 12.

Figure 4:
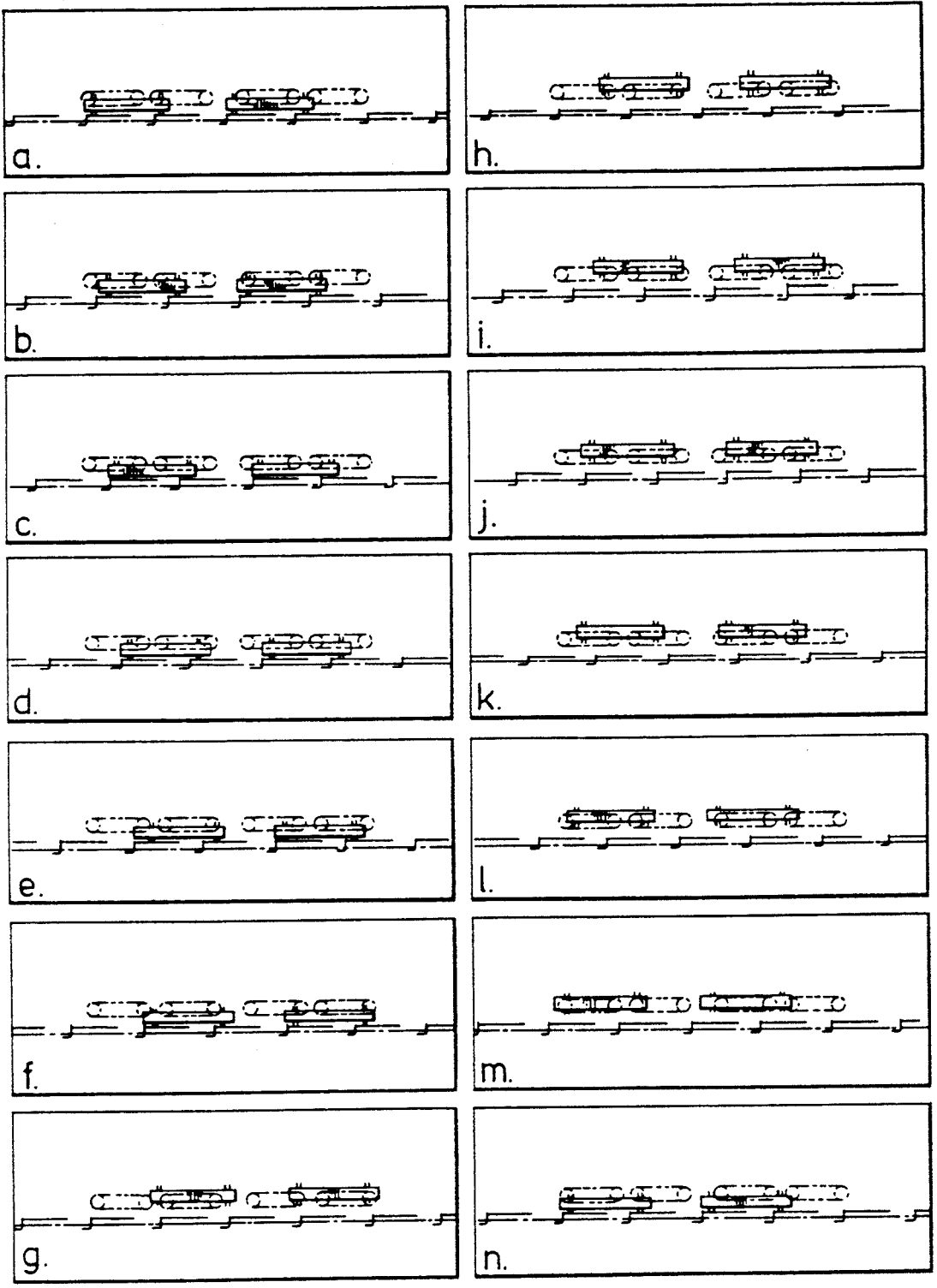
FIG. 4 is a series of views showing the operation of the smart card reader of FIG. 3.

FIG. 4 is a sequence of drawings illustrating the operation of the reader 110 of FIG. 3. Turning to FIG. 4, it will be seen that the consecutive drawings of this figure show reader 110 during consecutive instants of time.

There has been development work in the area of electromagnetically induced coupled chips. It will be apparent to those skilled in the art that the subject invention could be modified to replace contact probes 60 with electromagnetic sensors which would electromagnetically couple to the ports of an electromagnetically coupled chip.

Modifications will be apparent to those skilled in the art and, accordingly, the invention is defined in the claims.

What is claimed is:

1. An on-the-fly smart card reader comprising:
a card conveyor for continuously conveying smart cards, each having an embedded silicon chip with exposed ports, at regular intervals along a card path in a downstream direction;
a support supporting a smart card read head;
means for driving said support continuously in a circulating path, said circulating path having a path segment aligned with a portion of said card path, said driving means driving said support along said path segment in said downstream direction and in synchronism with said card conveyor such that said smart card read head is positioned for operative asssociation with the ports of a smart card travelling along said portion of said card path.

2. The smart card reader of claim 1 wherein said path segment of said circulating path is more proximate said card path than the remainder of said circulating path.

3. The smart card reader of claim 2 wherein said card conveyor comprises a card chute and a plurality of drive lugs spaced by said regular intervals for conveying cards along said drive chute.

4. The smart card reader of claim 3 wherein said read head comprises a plurality of spring loaded contact probes sized for contacting the ports of a silicon chip embedded in a smart card.

* * * * *